(12) United States Patent
Liang et al.

(10) Patent No.: US 11,988,287 B1
(45) Date of Patent: May 21, 2024

(54) INFLATION CONTROL APPARATUS AND INTERNAL CURING METHOD FOR IV-TYPE HYDROGEN STORAGE CONTAINER

(71) Applicant: Taiyuan University of Technology, Taiyuan (CN)

(72) Inventors: Jianguo Liang, Taiyuan (CN); Qingxue Huang, Taiyuan (CN); Chunxiang Miao, Taiyuan (CN); Yinhui Li, Taiyuan (CN); Zhaotun Jia, Taiyuan (CN); Kun Yang, Taiyuan (CN); Zemin Ning, Taiyuan (CN); Jianglin Liu, Taiyuan (CN); Zhanchun Chen, Taiyuan (CN); Lianyun Jiang, Taiyuan (CN); Chunjiang Zhao, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/501,458

(22) Filed: Nov. 3, 2023

(30) Foreign Application Priority Data

Jan. 9, 2023 (CN) .......................... 202310023695.4

(51) Int. Cl.
*F16J 15/34* (2006.01)
*F16J 12/00* (2006.01)

(52) U.S. Cl.
CPC ........... *F16J 15/3492* (2013.01); *F16J 12/00* (2013.01); *F16J 15/3452* (2013.01)

(58) Field of Classification Search
CPC ...... F16J 15/3492; F16J 15/3452; F16J 15/34; F16J 15/3404; F16J 15/3408; F16J 15/3412; F16J 15/3436; F16J 15/348
See application file for complete search history.

(56) References Cited

U.S. PATENT DOCUMENTS

2022/0128150 A1* 4/2022 Liang .................... F16J 15/342

FOREIGN PATENT DOCUMENTS

| CN | 107654653 A | * | 2/2018 | |
| CN | 109488769 A | * | 3/2019 | ........... F16J 15/3448 |

(Continued)

OTHER PUBLICATIONS

Search Report issued in Chinese Application No. 202310023695.4; dated Mar. 9, 2023; 7 pgs.

(Continued)

*Primary Examiner* — Gilbert Y Lee
(74) *Attorney, Agent, or Firm* — HAUPTMAN HAM, LLP

(57) ABSTRACT

An inflation control apparatus includes seal heads at ends of a container liner on a rack; a rotary inflation connector includes a static component and a rotating component. The rotating component is connected with the seal head; an inflation core tube is in the container liner, air holes are in the inflation core tube, and the two ends of the inflation core tube are connected with the static component of the rotary inflation connector respectively. A temperature and pressure sensor is in the container liner; an air compressor provides air for an air heater, the air heater introduces the heated air into an air inlet of the inflation core tube, an air outlet of the inflation core tube is connected with an air inlet of a flow regulating valve, and an air outlet of flow regulating valve is connected with an air inlet of the air compressor.

8 Claims, 7 Drawing Sheets

(56) References Cited

FOREIGN PATENT DOCUMENTS

| | | | | | |
|---|---|---|---|---|---|
| CN | 109973660 | A | * | 7/2019 | ............. F16J 15/002 |
| CN | 112728086 | A | * | 4/2021 | ............... F16J 15/16 |
| CN | 113404865 | A | * | 9/2021 | |

OTHER PUBLICATIONS

Notification to Grant Patent Right for Invention issued in Chinese Application No. 202310023695.4; dated Mar. 29, 2023; 3 pgs.

\* cited by examiner

INFLATION CONTROL APPARATUS AND INTERNAL CURING METHOD FOR IV-TYPE HYDROGEN STORAGE CONTAINER

RELATED APPLICATIONS

The present application claims priority from Chinese Application Number 202310023695.4, filed Jan. 9, 2023, the disclosure of which is hereby incorporated by reference herein in its entirety.

FIELD OF TECHNOLOGY

The present invention belongs to the technical field of curing of a hydrogen storage container, and specifically discloses an inflation control apparatus and internal curing method for an IV-type hydrogen storage container.

BACKGROUND

Fiber-reinforced composite materials have the characteristics of light weight, good mechanical properties, corrosion resistance, and high temperature resistance. Therefore, the fiber-reinforced composite materials are widely used in various industries such as national defense, aviation, aerospace, ships, and submersibles, and have great contributions to national security, national science and technology level and national economic level.

The molding quality of hydrogen storage container of fiber-reinforced composite materials depends largely on a curing process. A reasonable curing process can improve pressure-bearing capacity of the hydrogen storage container of composite materials. A traditional curing process mostly employs external curing (that is, a wrapped hydrogen storage container of composite materials is placed in a curing furnace or autoclave for heating and curing). For an IV-type hydrogen storage container of composite materials, since a liner thereof is made of modified plastic, special consideration needs to be given to collapse of the liner due to fiber tension during winding. If a traditional external curing process is still used, it would lead to irreparable defects in the liner, thus affecting the service life of the container.

SUMMARY

Provided in the present invention are an inflation control apparatus and an internal curing method for an IV-type hydrogen storage container, which solves a technical problem that the liner of the container collapses due to fiber tension during winding.

Provided in the present invention is an inflation control apparatus for an IV-type hydrogen storage container, wherein the apparatus comprises a rack, a container liner, a rotary inflation connector, an inflation core tube, a temperature and pressure sensor, an air compressor, a valve I, an air heater, an electrically controlled flow regulating valve, and a controller; seal heads at the two ends of the container liner are rotationally installed on the rack; the rotary inflation connector comprises a static component and a rotating component, the rotating component is rotatable relative to the static component, and the rotating component is fixedly connected with the seal head of the container liner; the inflation core tube is located in the container liner, the inflation core tube is provided with air holes thereon, and the two ends thereof are respectively fixedly connected with the static component of the rotary inflation connector; the temperature and pressure sensor is located in the container liner; the air compressor supplies air to the air heater via the valve I, and the air heater passes the air heated to a set temperature into an air inlet of the inflation core tube, an air outlet of the inflation core tube is connected to an air inlet of the electrically controlled flow regulating valve, and an air outlet of the electrically controlled flow regulating valve is connected with an air inlet of the air compressor; the controller is connected with a signal wire of the temperature and pressure sensor, and controls the size of a valve port of the electrically controlled flow regulating valve according to a value detected by the temperature and pressure sensor, thus adjusting an air flow.

Further, the static component comprises an end cap I, an end cap II and a static ring; the rotating component comprises a movable ring, a movable ring seat, a spring, and a spring gasket; the end cap I is sleeved on the seal head of the container liner, and is rotatably connected with the seal head, and is not movable axially along the seal head; the movable ring seat is sleeved on the seal head of the container liner, located in the inner side of the end cap I, is rotatable along with the seal head, and is not movable axially along the seal head; the spring is sleeved on the seal head of the container liner and located in the movable ring seat; an inner ring of the spring gasket is fixed on the seal head of the container liner, and an outer ring of the spring gasket is fixed on the movable ring seat, rotates with the seal head and the movable ring seat, and cooperates with the movable ring seat to compress the spring; an inner ring of the movable ring is fixed on the seal head of the container liner, an outer ring thereof is fixed on the movable ring seat, and rotates with the seal head and the movable ring seat, an annular end surface I is in sealing contact with the spring gasket, and a plurality of dynamic pressure grooves are evenly arranged in an annular end surface II, and the rotation direction of the dynamic pressure grooves is consistent with the rotation direction of the container liner; the static ring is fixed in the end cap II, and is provided with an inflation hole I; the end cap II is fixedly connected with the end cap I, so that the static ring is in contact with the annular end surface II of the movable ring, the end cap II is provided with an inflation hole II and an inflation hole III thereon, the inflation hole II is aligned with the inflation hole I, and the inflation hole III is fixedly connected with an end of the inflation core tube; the inflation control apparatus for the IV-type hydrogen storage container further comprises a diverter valve block I, a valve II and a valve III; an air outlet of the air compressor is connected with an air inlet of the diverter valve block I, and an air outlet I, an air outlet II and an air outlet III of the diverter valve block I are respectively connected with an air inlet of the valve I, an air inlet of the valve II, and an air inlet of the valve III, the air outlet of the valve I is connected with an air inlet of the air heater, and the air outlets of the valve II and valve III are respectively connected with the inflation holes II on the two end caps II; and inflation is conducted between the static ring and the movable ring through the inflation hole II and the inflation hole I; and the air inlet of the diverter valve block I is in communication with all of the air outlet I, the air outlet II and the air outlet III, and the air outlet I, the air outlet II and the air outlet III are independent of each other.

Further, each of the seal heads of the container liner is provided with an annular circlip groove; the rotary inflation connector further comprises a bearing I and a circlip which is installed on the annular circlip groove; the bearing I is sleeved on the seal head of the container liner, and is separated from the movable ring seat by being respectively located on either side of the circlip, an inner ring of the bearing I and the seal head are fixedly connected by concave-convex fit, and an outer ring of the bearing I and the end cap I are fixedly connected by concave-convex fit; and fixed connections between the movable ring seat and the seal head, between the inner ring of the spring gasket and the seal head, between the outer ring of the spring gasket and the movable ring seat, between the inner ring of the movable ring and the seal head, between the outer ring of the movable ring and the movable ring seat, between the end cap II and the static ring are all realized through concave-convex fit.

Further, the seal head of the container liner is provided with a limit protrusion I extending along an axial direction; the inner ring of the bearing I, the movable ring seat, the inner ring of the spring gasket, and the inner ring of the movable ring are all provided with limit grooves I that match with the limit protrusions I; the outer ring of the bearing I is provided with a limit protrusion II, and the end cap I is provided with to limit groove II matching with the limit protrusion II; an inner wall of the movable ring seat is provided with a limit protrusion III extending along an axial direction; the outer ring of the spring gasket and the outer ring of the movable ring are both provided with limit grooves III that match with the limit protrusions III; and a limit protrusion IV is arranged inside the end cap II, and a limit groove IV matching with the limit protrusion IV is arranged on the static ring.

Further, an annular sealing ring groove is arranged on the annular end surface I of the movable ring, and a movable ring sealing ring in contact with the spring gasket is installed in the annular sealing ring groove, and the inner ring of the movable ring sealing ring is provided with the limit groove I; and an end cap sealing ring is installed between the end cap II and the end cap I.

Further, a signal wire hole is arranged on the end cap II of the rotary inflation connector on one side, and a sensor installation rod with a hollow structure is installed on the inner side of the signal wire hole; and the temperature and pressure sensor is installed on the sensor installation rod, and the signal wire passes through the sensor installation rod and the signal wire hole to connect with the controller.

Further, the rack comprises a square frame, two horizontal installation rods and two vertical installation plates; the two vertical installation plates are located in the square frame, and are parallel to two vertical beams of the square frame; each of the horizontal installation rods pass through the vertical installation plates and the two vertical beams of the square frame; the seal heads at both ends of the container liner are rotatably installed on the vertical installation plates through a bearing II; an inner ring of the bearing II is provided with the limit groove I, and an outer ring is provided with a limit protrusion V; and a limit groove V matching with the limit protrusion V is arranged on the vertical installation plate.

Further, the inflation control apparatus for an IV-type hydrogen storage container described as above further comprises a valve IV and a diverter valve block II; the diverter valve block I is further provided with an air outlet IV communicated with the air inlet; and the air outlet I, the air outlet II, the air outlet III and the air outlet IV are independent of each other; the air outlet IV of the diverter valve block I is connected with an air inlet of the valve IV; an air outlet of the air heater and an air outlet of the valve IV are respectively connected to an air inlet I and an air inlet II of the diverter valve block II, and an air outlet of the diverter valve block II is connected to the air inlet of the inflation core tube; and both the air inlet I and the air inlet II of the diverter valve block II are in communication with the air outlet; and the air inlet I and the air inlet II are independent of each other.

Further, the electrically controlled flow regulating valve is electromagnetically controlled, and comprises an electromagnet, a valve seat, a pressure regulating nut, a valve stem, a regulating spring, and a lock nut; the valve seat is provided with an air inlet, an air outlet, and an air passage communicating the air inlet with the air outlet; both ends of the air passage are provided with internal threads, the pressure regulating nut is installed at a first end, and the lock nut is installed at a second end; the valve stem passes through the pressure regulating nut, the first end is connected with a push-pull rod of the electromagnet, and the second end is provided with a valve core which is in sealing contact with the inner wall of the air passage; and the adjusting spring is installed between the valve core and the lock nut, and the two ends are respectively pressed by the valve core and the lock nut.

Also provided in the present invention is an internal curing method for an IV-type hydrogen storage container, the parameters of the air heater in the above-mentioned inflation control apparatus for the IV-type hydrogen storage container are set in advance according to a curing temperature, the air heated to the set temperature is passed into the container liner, the temperature and pressure sensor detects the temperature and pressure in the container liner in real time, and the controller controls the size of the valve port of the electrically controlled flow regulating valve according to a value detected by the temperature and pressure sensor to adjust the air flow, so that the temperature value and pressure value in the container liner satisfy a curing condition, the container liner is rotated, and fiber winding is carried out outside the container liner, and hot air passes through the container liner to cure the fiber materials wound on an outer layer of the container liner.

The present invention has following beneficial effects:

In the present invention, the electronical signal is transmitted to the controller through the temperature and pressure sensor arranged in the container liner, and then the controller adjusts the size of the valve port of the electrically controlled flow regulating valve in real time according to the detected value, thereby dynamically controlling the air flow of the air during the entire curing process in real-time and maintaining the temperature and pressure in the container liner in a moving balance; and when the container liner collapses due to the fiber tension during the winding process, it can be compensated by adjusting the pressure in time;

The rotary inflation connector adopts the moving pressure air stiffness to achieve the required sealing effect, which solves the sealing problem between the seal heads of the container liner and the inflation pipeline, which is especially important for the forming of IV-type hydrogen storage container.

BRIEF DESCRIPTION OF THE DRAWINGS

In order to more clearly state specific embodiments of the present invention or technical schemes in the prior art, the following is a brief introduction of the drawings required to be used in the description of the specific embodiments or the prior art. It is obvious that the drawings described below are some embodiments of the present invention. For an ordinary person skilled in the art, other drawings can also be obtained from these drawings without creative labor.

Figure 1:
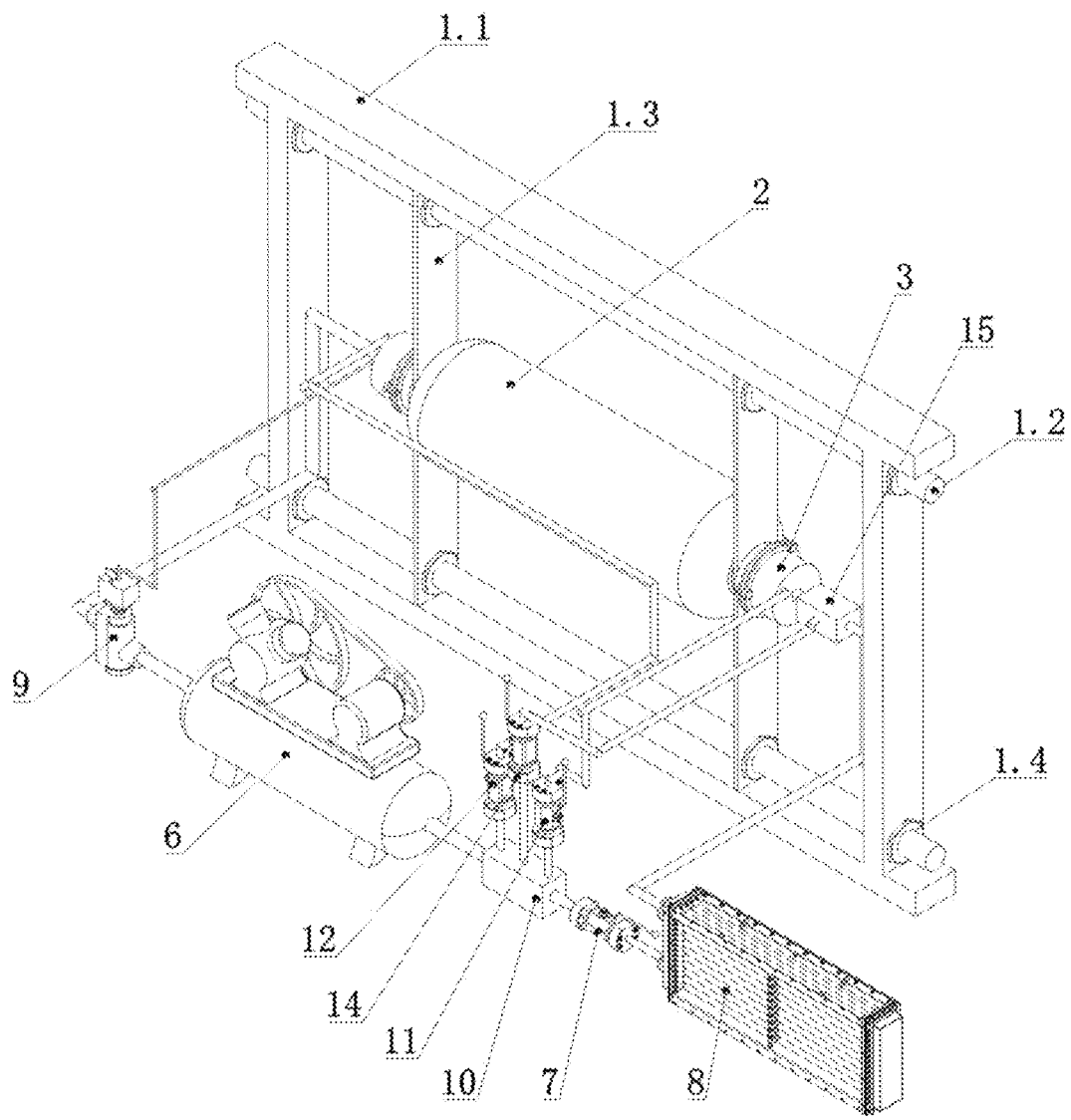
FIG. 1 is a structure diagram of an inflation control apparatus for an IV-type hydrogen storage container.
Figure 2:
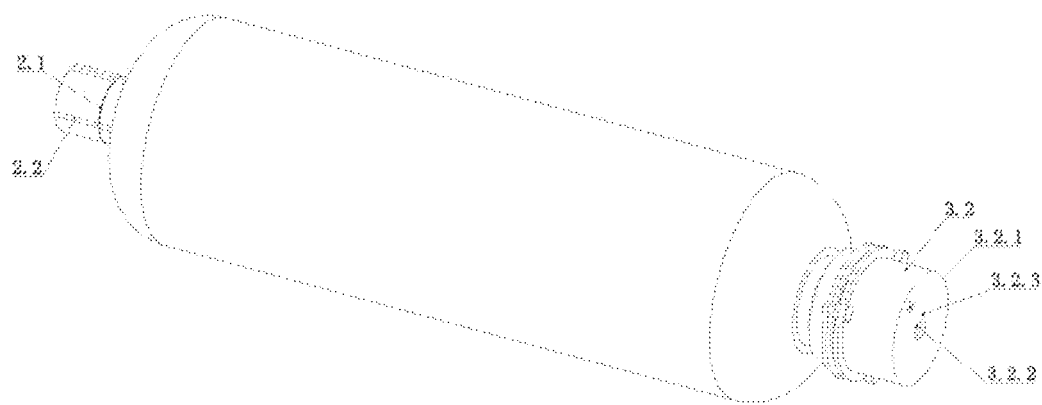
FIG. 2 is a connection diagram of a container liner and a rotary inflation connector.
Figure 3:
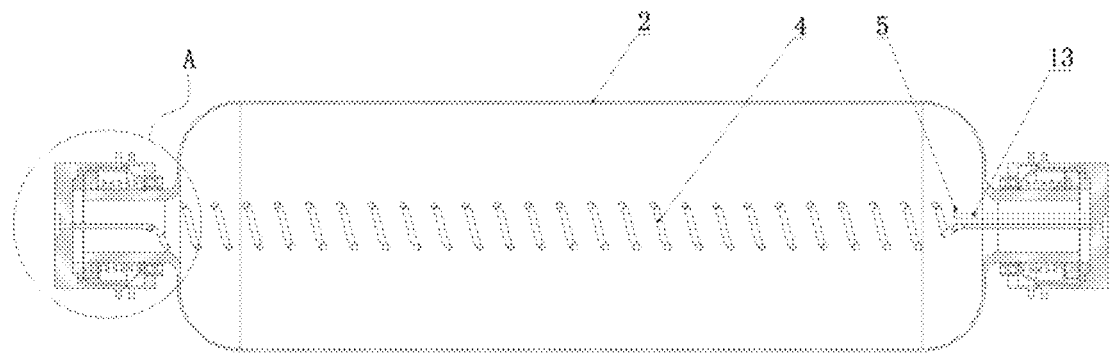
FIG. 3 is an axial section view of the container liner.
Figure 4:
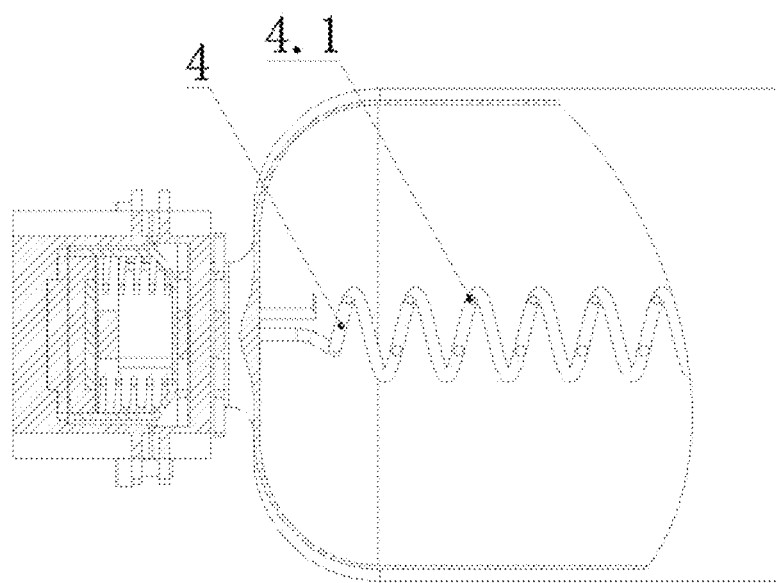
FIG. 4 is a partial section view of the container liner.
Figure 5:
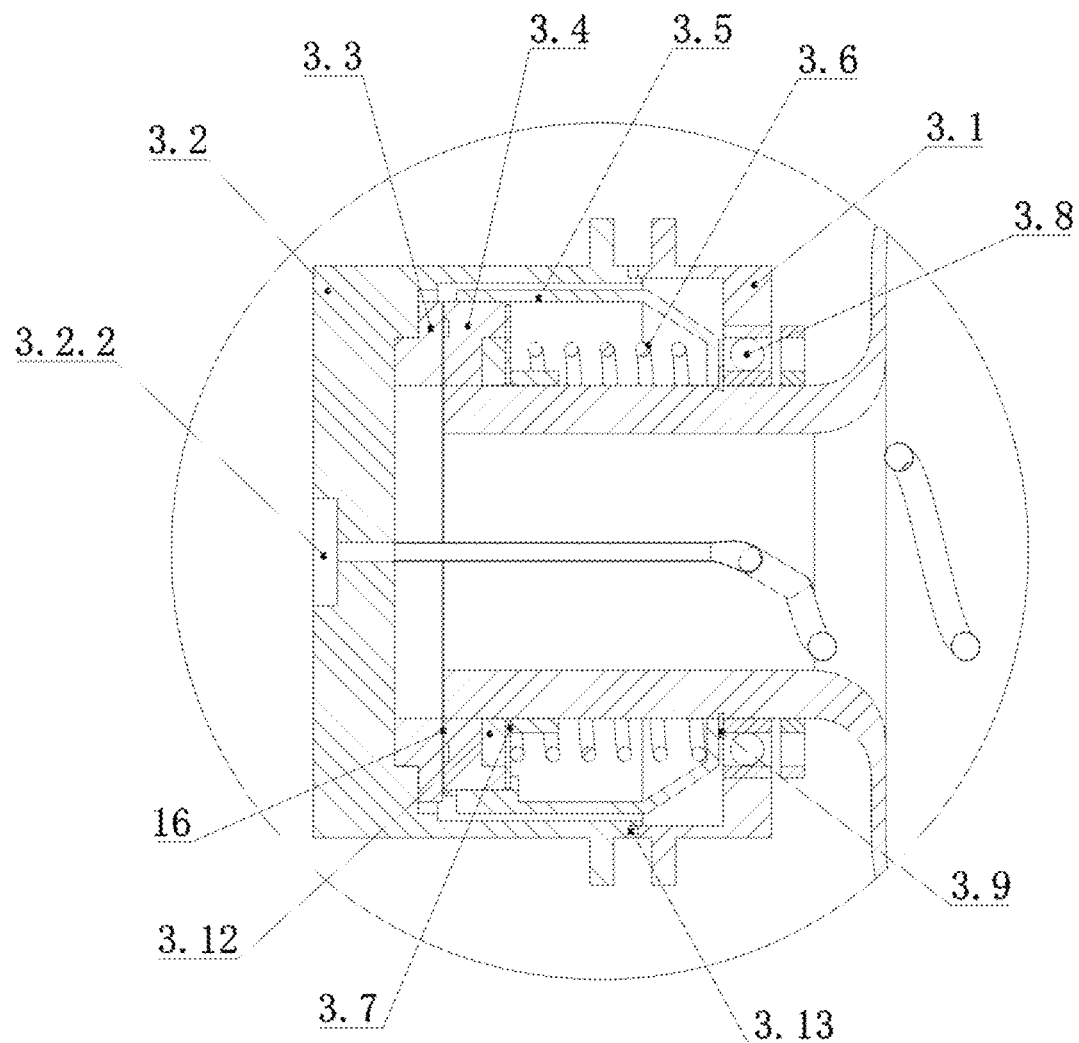
FIG. 5 is an enlarged view of Part A in FIG. 3.
Figure 6:
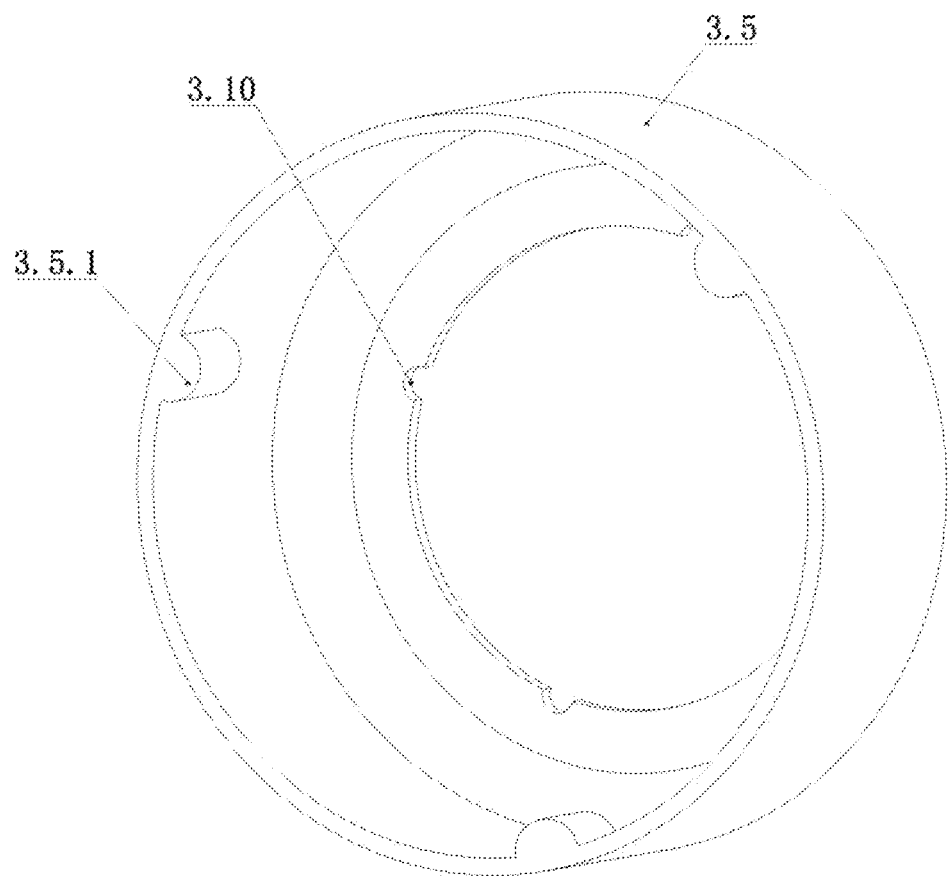
FIG. 6 is a structure diagram of a movable ring seat.
Figure 7:
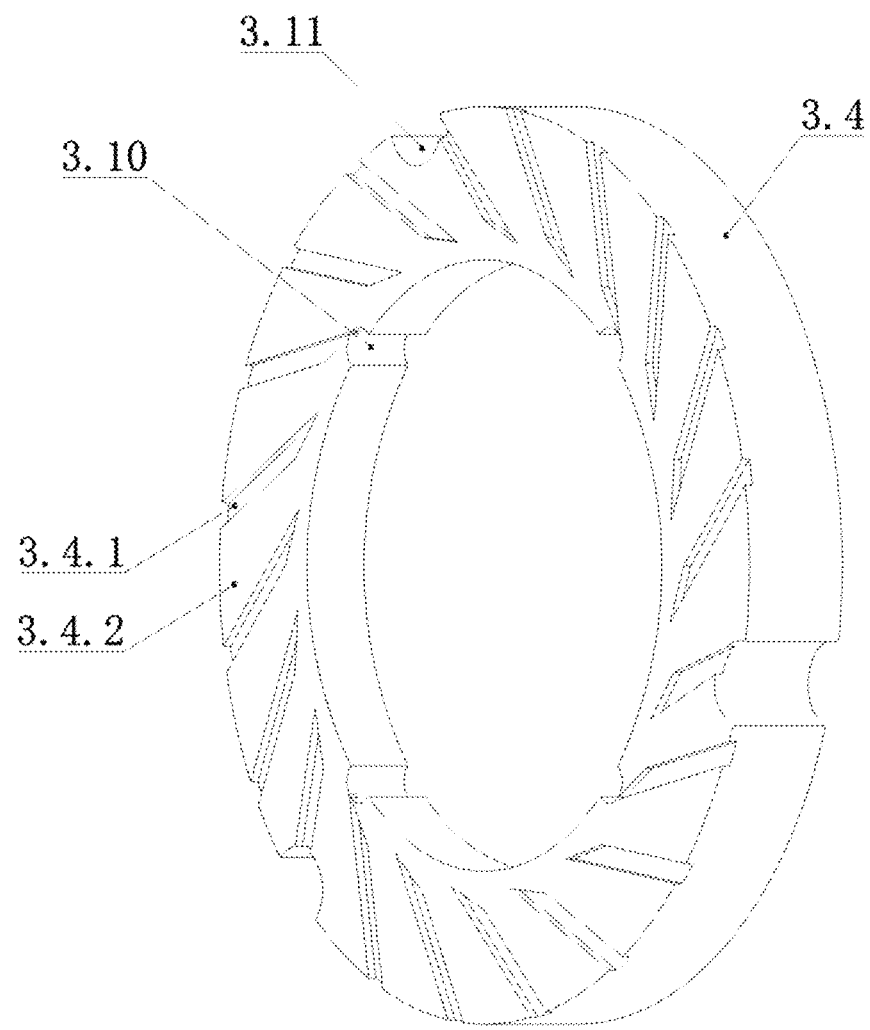
FIG. 7 is a structure diagram of a movable ring.
Figure 8:
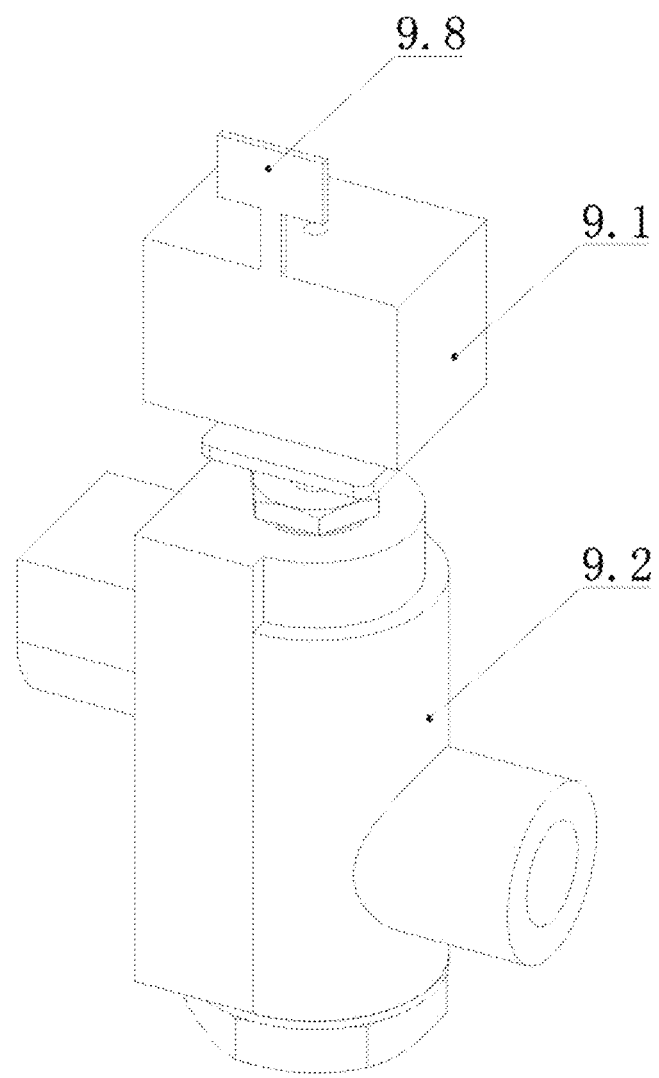
FIG. 8 is a structure diagram of an electrically controlled flow regulating valve.
Figure 9:
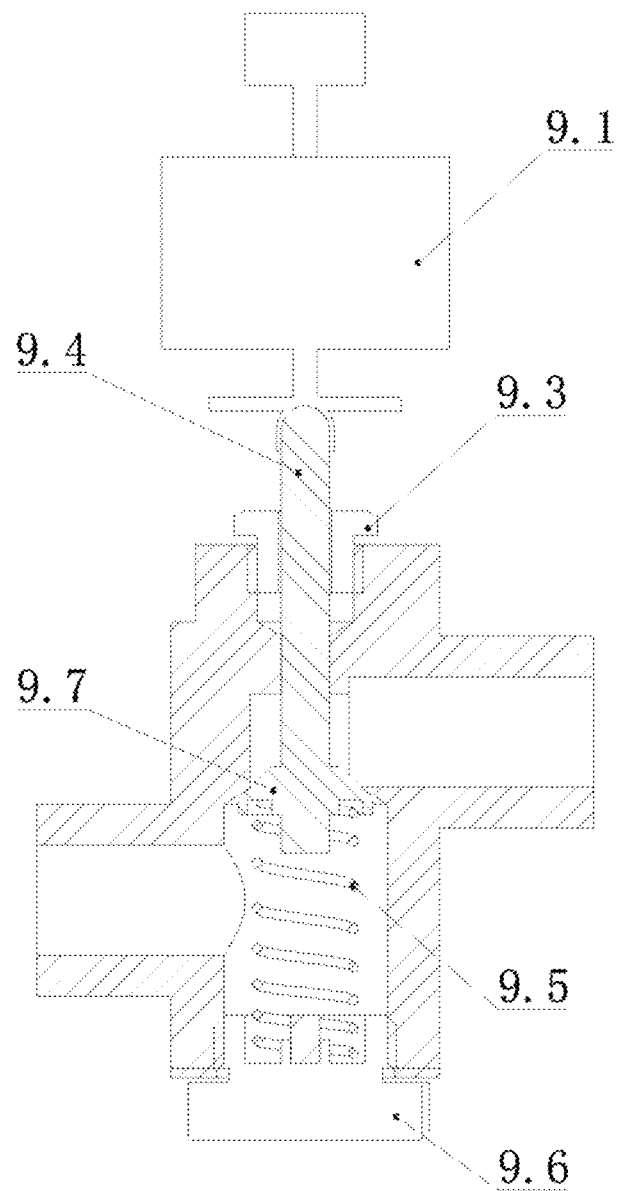
FIG. 9 is an internal diagram of the electrically controlled flow regulating valve.

In the figures: 1.1—square frame; 1.2—horizontal installation rod; 1.3—vertical installation plate; 1.4—limit nut; 2—container liner; 2.1—annular circlip groove; 2.2—limit protrusion I; 3—rotary inflation connector; 3.1—end cap I; 3.2—end cap II; 3.2.1—inflation hole II; 3.2.2—inflation hole III; 3.2.3—signal wire hole; 3.3—static ring; 3.4—movable ring; 3.4.1—dynamic pressure groove; 3.4.2—sealing weir; 3.5—movable ring seat; 3.5.1—limit protrusion III; 3.6—spring; 3.7—spring gasket; 3.8—bearing I; 3.9—circlip; 3.10—limit groove I; 3.11—limit groove III; 3.12—movable ring sealing ring; 3.13—end cap sealing ring; 4—inflation core tube; 4.1—air hole; 5—temperature and pressure sensor; 6—air compressor; 7—valve I; 8—air heater; 9—electrically controlled flow regulating valve; 9.1—electromagnet; 9.2—valve seat; 9.3—pressure regulating nut; 9.4—valve stem; 9.5—regulating spring; 9.6—lock nut; 9.7—valve core; 9.8—display screen; 10—diverter valve block I; 11—valve II; 12—valve III; 13—sensor installation rod; 14—valve IV; 15—diverter valve block II; 16—air film stiffness gap.

DESCRIPTION OF THE EMBODIMENTS

The technical schemes of the present invention will be clearly and completely described below in conjunction with the accompanying drawings. Obviously, the described examples are part of the examples of the present invention, but not all of them. Based on the examples of the present invention, all other examples obtained by an ordinary person skilled in the art without making creative efforts belong to the protection scope of the present invention.

Example 1

Provided in this example is an inflation control apparatus for an IV-type hydrogen storage container, wherein the apparatus comprises a rack, a container liner 2, a rotary inflation connector 3, an inflation core tube 4, a temperature and pressure sensor 5, an air compressor 6, a valve I 7, an air heater 8, an electrically controlled flow regulating valve 9, and a controller.

Seal heads at the two ends of the container liner 2 are rotationally installed on the rack, and a drive mechanism for driving the container liner 2 to rotate is installed on the rack; the rotary inflation connector 3 comprises a static component and a rotating component, the rotating component is rotatable relative to the static component, and the rotating component is fixedly connected with the seal head of the container liner 2; the inflation core tube 4 is located in the container liner 2, the inflation core tube 4 is evenly provided with air holes 4.1, and the inflation core tube 4 is in a spiral shape to ensure that the surface of the container liner 2 is evenly heated, and the two ends thereof are respectively fixedly connected with the static component of the rotary inflation connector 3; the temperature and pressure sensor 5 is located in the container liner 2; the air compressor 6 supplies air to the air heater 8 via the valve I 7, and the air heater 8 passes the air heated to a set temperature into an air inlet of the inflation core tube 4, an air outlet of the inflation core tube 4 is connected to an air inlet of the electrically controlled flow regulating valve 9 through a pipeline, and an air outlet of the electrically controlled flow regulating valve 9 is connected with an air inlet of the air compressor 6 through a pipeline; the controller is connected with a signal wire of the temperature and pressure sensor 5, and controls the size of a valve port of the electrically controlled flow regulating valve 9 according to a value detected by the temperature and pressure sensor 5, thus adjusting an air flow.

During the entire curing procedure, the rotary inflation connectors 3 are used as a sealing structure to ensure sealing effect between the seal heads of the container liner 2 and hot-compressed air; the temperature and pressure sensor 5 provides an electronical signal to a controller, and the controller controls and regulates the temperature and pressure of the hot-compressed air in the container liner 2 through the electrically controlled flow regulating valve 9 in real time to maintain them within a set range; the air compressor 6 provides compressed air, and the air heater 8 heats the air to a set temperature value, and a cycle in which the hot air flow value can be controlled electronically is finally formed, so as to ensure a moving balance in the whole curing procedure. Composite materials wound on an outer layer of the container liner 2 is cured by internal purging the hot-compressed air. Compared with an external curing method, the porosity of the composite materials wound on an inner layer can be reduced. When the container liner 2 collapses due to the fiber tension during the winding, it can be compensated by adjusting the pressure in time, which greatly improves the molding quality and effect of the IV-type container.

Further, the electrically controlled flow regulating valve 9 is electromagnetically controlled, and comprises an electromagnet 9.1, a valve seat 9.2, a pressure regulating nut 9.3, a valve stem 9.4, a regulating spring 9.5, a lock nut 9.6 and a display screen 9.8 for displaying the flow; the valve seat 9.2 is provided with an air inlet, an air outlet, and an air passage communicating the air inlet with the air outlet; both ends of the air passage are provided with internal threads, the pressure regulating nut 9.3 is installed at a first end, and the lock nut 9.6 is installed at a second end; the valve stem 9.4 passes through the pressure regulating nut 9.3, the first end thereof is connected with a push-pull rod of the electromagnet 9.1, and the second end thereof is provided with a valve core 9.7 which is in sealing contact with the inner wall of the air passage; and the adjusting spring 9.5 is installed between the valve core 9.7 and the lock nut 9.6, and the two ends are respectively pressed by the valve core 9.7 and the lock nut 9.6.

According to the value detected by the temperature and pressure sensor 5, the controller controls extension of the push-pull rod of the electromagnet 9.1, and adjusts the position of the valve core 9.7 on the valve stem 9.4 in the air passage, thereby regulating the air flow. The depth that the pressure regulating nut 9.3 is screwed into the valve seat 9.2 determines an extreme value of downward movement of the valve stem 9.4.

Example 2

In this example, the rotary inflation connectors 3 adopt the moving pressure air stiffness to achieve the required sealing effect, which solves the sealing problem between the seal heads of the container liner 2 and the inflation pipeline, which is especially important for the forming of IV-type hydrogen storage container.

The stationary component comprises an end cap I 3.1, an end cap II 3.2 and a static ring 3.3; the rotating component comprises a movable ring 3.4, a movable ring seat 3.5, a spring 3.6, and a spring gasket 3.7; the end cap I 3.1 is sleeved on the seal head of the container liner 2, and is rotatably connected with the seal head, and is not movable axially along the seal head; the movable ring seat 3.5 is sleeved on the seal head of the container liner 2, located in the inner side of the end cap I 3.1, is rotatable along with the seal head, and is not movable axially along the seal head; the spring 3.6 is sleeved on the seal head of the container liner 2 and located in the movable ring seat 3.5; an inner ring of the spring gasket 3.7 is fixed on the seal head of the container liner 2, an outer ring of the spring gasket is fixed on the movable ring seat 3.5, rotates along with the seal head and the movable ring seat 3.5, and cooperates with the movable ring seat 3.5 to compress the spring 3.6; an inner ring of the movable ring 3.4 is fixed on the seal head of the container liner 2, an outer ring thereof is fixed on the movable ring seat 3.5, and rotates along with the seal heads and the movable ring seat 3.5, an annular end surface I is in sealing contact with the spring gasket 3.7, and a plurality of dynamic pressure grooves 3.4.1 are evenly arranged in an annular end surface II, and the rotation direction of the dynamic pressure grooves 3.4.1 is consistent with the rotation direction of the container liner 2; the static ring 3.3 is fixed in the end cap II 3.2, and is provided with an inflation hole I; and the end cap II 3.2 is fixedly connected with the end cap I 3.1 through a bolt, so that the static ring 3.3 is in contact with the annular end surface II of the movable ring 3.4, the end cap II 3.2 is provided with an inflation hole II 3.2.1 and an inflation hole III 3.2.2, the inflation hole II 3.2.1 is aligned with the inflation hole I, and the inflation hole III 3.2.2 is fixedly connected with the end of the inflation core tube 4 through threads, so as to ensure the sealing.

The inflation control apparatus for the IV-type hydrogen storage container further comprises a diverter valve block I 10, a valve II 11 and a valve III 12; an air outlet of the air compressor 6 is connected with an air inlet of the diverter valve block I 10 through a pipeline, and an air outlet I, an air outlet II and an air outlet III of the diverter valve block I 10 are respectively connected with an air inlet of the valve I 7, an air inlet of the valve II 11, and an air inlet of the valve III 12 through a pipeline, the air outlet of the valve I 7 is connected with an air inlet of the air heater 8 through a pipeline, and the air outlets of the valve II 11 and valve III 12 are respectively connected with the inflation holes II 3.2.1 on the two end caps II 3.2 through pipelines, and inflation is conducted between the static ring 3.3 and the movable ring 3.4 through the inflation hole II 3.2.1 and the inflation hole I; and the air inlet of the diverter valve block I 10 is in communication with the air outlet I, the air outlet II and the air outlet III, and the air outlet I, the air outlet II and the air outlet III are independent of each other.

After the installation of the rotary inflation connectors 3 is completed, the movable ring 3.4 and the static ring 3.3 are closely attached to each other under the action of the spring 3.6. In an initial stage, the valve I 7 is closed, the valve II 11 and the valve III 12 are opened, and air is respectively supplied to the dynamic pressure grooves 3.4.1 of the two rotary inflation connectors 3, and a driving mechanism is turned on to drive the container liner 2 to rotate. When the movable ring 3.4 rotates with the container liner 2, air in the dynamic pressure grooves 3.4.1 is sheared and flows from an outer edge to a center, generating a moving pressure; and a sealing weir 3.4.2 between two adjacent dynamic pressure grooves 3.4.1 can inhibit the outflow of air (the existence of static pressure), so that the air flow is blocked, the air pressure increases, and the increased pressure would separate a flexible fixed static ring 3.3 from a matched movable ring 3.4. When the air pressure is balanced with an elastic force of the spring 3.6, a minimum gap is maintained to form an air film to seal the working air. In this way, the movable ring and the static ring are not in contact with each other, and the air film has good elasticity, and eventually the rigidity of the air film is formed to ensure the air sealing between the rotary inflation connectors 3 and the container liner 2.

Further, the seal heads of the container liner 2 are provided with an annular circlip groove 2.1; the rotary inflation connector 3 further comprises a bearing I 3.8 and a circlip 3.9 which is installed on the annular circlip groove 2.1; the bearing I 3.8 is sleeved on the seal head of the container liner 2, and is separated from the movable ring seat 3.5 by being respectively located on either side of the circlip 3.9, an inner ring of the bearing I and the seal head are fixedly connected by concave-convex fit, and an outer ring of the bearing I and the end cap I 3.1 are fixedly connected by concave-convex fit; the axial movement of the end cap I 3.1 and the movable ring seat 3.5 is limited by the circlip 3.9; and fixed connections between the movable ring seat 3.5 and the seal head, between the inner ring of the spring gasket 3.7 and the seal head, between the outer ring of the spring gasket 3.7 and the movable ring seat 3.5, between the inner ring of the movable ring 3.4 and the seal head, between the outer ring of the movable ring 3.4 and the movable ring seat 3.5, between the end cap II 3.2 and the static ring 3.3 are all realized through concave-convex fit.

In this example, a specific way of the concave-convex fit is as follows: the seal head of the container liner 2 is provided with a limit protrusion I 2.2 extending along an axial direction; the inner ring of the bearing I 3.8, the movable ring seat 3.5, the inner ring of the spring gasket 3.7, and the inner ring of the movable ring 3.4 are all provided with limit grooves I 3.10 that match with the limit protrusions I 2.2; the outer ring of the bearing I 3.8 is provided with a limit protrusion II, and the end cap I 3.1 is provided with the limit groove II matching with the limit protrusion II; the inner wall of the movable ring seat 3.5 is provided with a limit protrusion III 3.5.1 extending along an axial direction; the outer ring of the spring gasket 3.7 and the outer ring of the movable ring 3.4 are both provided with limit grooves III 3.11 that match with the limit protrusions III 3.5.1; and limit protrusions IV are arranged inside the end cap II 3.2, and limit grooves IV matching with the limit protrusions IV are arranged on the static ring 3.3. The exchange of the positions of the limit protrusions and the limit grooves is also within the protection scope of this patent.

Further, an annular sealing ring groove is arranged on the annular end surface I of the movable ring 3.4, and a movable ring sealing ring 3.12 in contact with the spring gasket 3.7 is installed in the annular sealing ring groove, the inner ring of the movable ring sealing ring 3.12 is provided with the limit groove I 3.10; and an end cap sealing ring 3.13 is installed between the end cap II 3.2 and the end cap I 3.1 to ensure the air sealing therebetween.

Further, axial cross section of each of the limit protrusion I 2.2, the limit groove I 3.10, the limit protrusion II, the limit groove II, the limit protrusion III 3.5.1, and the limit groove III 3.11 is arc-shaped; and the limit protrusion IV comprises a limit post and an annular boss, and the limit groove IV comprises a limit hole and an annular groove.

Further, a signal wire hole 3.2.3 is provided on the end cap II 3.2 of the rotary inflation connector 3 on one side, and a sensor installation rod 13 with a hollow structure is installed on the inner side of the signal wire hole 3.2.3 through threads; and the temperature and pressure sensor 5 is installed on the sensor installation rod 13, and the signal wire passes through the sensor installation rod 13 and the signal wire hole to connect with the controller.

Further, the rack comprises a square frame 1.1, two horizontal installation rods 1.2, two vertical installation plates 1.3 and limit nuts 1.4; the two vertical installation plates 1.3 are located in the square frame 1.1, and are parallel to two vertical beams of the square frame 1.1; the two vertical installation plates 1.3 and the two vertical beams of the square frame 1.1 are both provided with light holes; the horizontal installation rods 1.2 are threaded rods, and pass through the light holes in the vertical installation plates 1.3 and the two vertical beams of the square frame; the distance between the two vertical installation plates 1.3 is adjusted according to the length of the container liner 2, and after installing the container liner 2, the limit nuts 1.4 are installed on the horizontal installation rods 1.2, the limit nuts 1.4 are needed to be installed on both sides of the vertical beams and both sides of the vertical installation plates 1.3 to fix the position of the container liner 2; the seal heads at both ends of the container liner 2 are rotatably installed on the vertical installation plates 1.3 through a bearing II; the inner ring of the bearing II is provided with the limiting groove I 3.10, which is matched with limit protrusion I 2.2; and the outer ring is provided with a limiting protrusion V; and a limiting groove V matching with the limiting protrusion V is arranged on the vertical installation plate 1.3.

Example 3

In this embodiment, the inflation control apparatus for an IV-type hydrogen storage container further comprises a valve IV 14 and a diverter valve block II 15; the diverter valve block I 10 is further provided with an air outlet IV communicated with the air inlet, and the air outlet I, the air outlet II, the air outlet III and the air outlet IV are independent of each other; the air outlet IV of the diverter valve block I 10 is connected with an air inlet of the valve IV 14; an air outlet of the air heater 8 and an air outlet of the valve IV 14 are respectively connected to an air inlet I and an air inlet II of the diverter valve block II 15, and an air outlet of the diverter valve block II 15 is connected to the air inlet of the inflation core tube 4; and both the air inlet I and the air inlet II of the diverter valve block II 15 are in communication with the air outlet, and the air inlet I and the air inlet II are independent of each other.

The valve I 7, valve II 11, valve III 12 and valve IV 14 are all manual valves.

Example 4

Provided in this example is an internal curing method for an IV-type hydrogen storage container, the parameters 8 of the air heater in the above-mentioned inflation control apparatus for the IV-type hydrogen storage container are set in advance according to a curing temperature, the air heated to the set temperature is passed into the container liner 2, the temperature and pressure sensor 5 detects the temperature and pressure in the container liner 2 in real time, and the controller controls the size of the valve port of the electrically controlled flow regulating valve 9 according to a value detected by the temperature and pressure sensor 5 to adjust the air flow, so that the temperature value and pressure value in the container liner 2 satisfy a curing condition, the container liner 2 is rotated, and fiber winding is carried out outside the container liner 2, and hot air passes through the container liner 2 to cure the fiber materials wound on the outer layer of the container liner 2.

The container liner 2 is made of modified plastic, the impregnating resin used is epoxy resin, and the fiber material is carbon fiber or glass fiber.

A specific operation process is as follows:
S1. turning on the air heater 8, closing the valve I 7 and the valve IV 14, opening the valve II 11 and the valve III 12, supplying air into the dynamic pressure grooves 3.4.1 of the two rotary inflation connectors 3, turning on the driving mechanism to drive the container liner 2 to rotate, so as to form the air film rigidity to ensure the air sealing between the rotary inflation connectors 3 and the container liner 2;
S2. turning down the valve II 11 and the valve III 12 to meet the requirement of air stiffness, opening the valve I 7 so that the compressed air flows into the air heater 8 for heating and flows into the container liner 2 through the inflation core tube 4 after being heated to the set temperature, and the container liner 2 is evenly heated through the air outlet holes 4.1 arranged on the inflation core tube 4;
S3. detecting, by the temperature and pressure sensor 5, the temperature value and pressure value in the container liner 2 in real time, and controlling, by the controller, the size of the valve port of the electronic controlled flow regulating valve 9 according to the value detected by the temperature and pressure sensor 5 to adjust the air flow, so that the temperature and pressure values in the container liner 2 satisfy the curing condition.

Example 5

Provided in this example is a method for maintaining the air pressure in an IV-type hydrogen storage container, comprising the following steps:
S1. closing the valve I 7 and the valve IV 14, opening the valve II 11 and the valve III 12, supplying air into the dynamic pressure grooves 3.4.1 of the two rotary inflation connectors 3 respectively, turning on the driving mechanism to drive the container liner 2 to rotate, and forming the air film stiffness to ensure the air sealing between the rotary inflation connectors 3 and the container liner 2;
S2. turning down the valve II 11 and the valve III 12 to meet the requirement of air stiffness, opening the valve IV 14 so that the compressed air flows directly into the container liner 2 through the inflation core tube 4, and inflating the container liner 2 through the air outlet holes 4.1 arranged on the inflation core tube 4;
S3. detecting, by the temperature and pressure sensor 5, the pressure value in the container liner 2 in real time, and controlling, by the controller, the size of the valve port of the electrically controlled flow regulating valve 9 according to the value detected by the temperature and pressure sensor 5 to adjust the air flow, so that the pressure in the container liner 2 satisfies a filament winding condition.

Finally, it should be noted that: the above embodiments are only used to illustrate the technical schemes of the present invention, rather than limiting them; although the present invention has been described in detail with reference to the foregoing embodiments, an ordinary person skilled in the art should understand that: it is still possible to modify the technical schemes described in the foregoing embodiments, or carry out equivalent substitutions for some or all of the technical features; and these modifications or substitutions do not make the essence of the corresponding technical schemes deviate from the scope of the technical schemes of the various embodiments in the present invention.

What is claimed is:

1. An inflation control apparatus for an IV-type hydrogen storage container, wherein the apparatus comprises a rack, a container liner, a rotary inflation connector, an inflation core tube, a temperature and pressure sensor, an air compressor, a valve I, an air heater, an electrically controlled flow regulating valve, and a controller;

seal heads at the two ends of the container liner are rotationally installed on the rack;
   the rotary inflation connector comprises a static component and a rotating component, the rotating component is rotatable relative to the static component, and the rotating component is fixedly connected with the seal head of the container liner;
   the inflation core tube is located in the container liner, the inflation core tube is provided with air holes thereon, and the two ends thereof are respectively fixedly connected with the static component of the rotary inflation connector;
   the temperature and pressure sensor is located in the container liner;
   the air compressor supplies air to the air heater via the valve I, and the air heater passes the air heated to a set temperature into an air inlet of the inflation core tube, an air outlet of the inflation core tube is connected to an air inlet of the electrically controlled flow regulating valve, and an air outlet of the electrically controlled flow regulating valve is connected with an air inlet of the air compressor;
   the controller is connected with a signal wire of the temperature and pressure sensor, and controls the size of a valve port of the electrically controlled flow regulating valve according to a value detected by the temperature and pressure sensor, thus adjusting an air flow;
   the static component comprises an end cap I, an end cap II and a static ring;
   the rotating component comprises a movable ring, a movable ring seat, a spring, and a spring gasket;
   the end cap I is sleeved on the seal head of the container liner, and is rotatably connected with the seal head, and is not movable axially along the seal head;
   the movable ring seat is sleeved on the seal head of the container liner, located in the inner side of the end cap I, is rotatable along with the seal head, and is not movable axially along the seal head;
   the spring is sleeved on the seal head of the container liner and located in the movable ring seat;
   an inner ring of the spring gasket is fixed on the seal head of the container liner, and an outer ring of the spring gasket is fixed on the movable ring seat, rotates along with the seal head and the movable ring seat, and cooperates with the movable ring seat to compress the spring;
   an inner ring of the movable ring is fixed on the seal head of the container liner, an outer ring of the movable ring is fixed on the movable ring seat, and rotates along with the seal head and the movable ring seat, an annular end surface I is in sealing contact with the spring gasket, and a plurality of dynamic pressure grooves are evenly arranged in an annular end surface II, and the rotation direction of the dynamic pressure grooves is consistent with the rotation direction of the container liner;
   the static ring is fixed in the end cap II, and is provided with an inflation hole I;
   the end cap II is fixedly connected with the end cap I, so that the static ring is in contact with the annular end surface II of the movable ring, the end cap II is provided with an inflation hole II and an inflation hole III thereon, the inflation hole II is aligned with the inflation hole I, and the inflation hole III is fixedly connected with an end of the inflation core tube;
   the inflation control apparatus for the IV-type hydrogen storage container further comprises a diverter valve block I, a valve II and a valve III;
   an air outlet of the air compressor is connected with an air inlet of the diverter valve block I, and an air outlet I, an air outlet II and an air outlet III of the diverter valve block I are respectively connected with an air inlet of the valve I, an air inlet of the valve II, and an air inlet of the valve III, the air outlet of the valve I is connected with an air inlet of the air heater, and the air outlets of the valve II and valve III are respectively connected with the inflation holes II on the two end caps II, and inflation is conducted between the static ring and the movable ring through the inflation hole II and the inflation hole I; and
   the air inlet of the diverter valve block I is in communication with all of the air outlet I, the air outlet II and the air outlet III; and the air outlet I, the air outlet II and the air outlet III are independent of each other.

2. The inflation control apparatus for an IV-type hydrogen storage container according to claim 1, wherein the seal head of the container liner is provided with an annular circlip groove;
   the rotary inflation connector further comprises a bearing I and a circlip which is installed on the annular circlip groove;
   the bearing I is sleeved on the seal head of the container liner, and is separated from the movable ring seat by being respectively located on either side of the circlip, an inner ring of the bearing I and the seal head are fixedly connected by concave-convex fit, and an outer ring of the bearing I and the end cap I are fixedly connected by concave-convex fit; and
   fixed connections between the movable ring seat and the seal head, between the inner ring of the spring gasket and the seal head, between the outer ring of the spring gasket and the movable ring seat, between the inner ring of the movable ring and the seal head, between the outer ring of the movable ring and the movable ring seat, between the end cap II and the static ring are all realized through concave-convex fit.

3. The inflation control apparatus for an IV-type hydrogen storage container according to claim 2, wherein the seal head of the container liner is provided with a limit protrusion I extending along an axial direction;
   the inner ring of the bearing I, the movable ring seat, the inner ring of the spring gasket, and the inner ring of the movable ring are all provided with limit grooves I that match with the limit protrusions I;

the outer ring of the bearing I is provided with a limit protrusion II, and the end cap I is provided with a limit groove II matching with the limit protrusion II;

an inner wall of the movable ring seat is provided with a limit protrusion III extending along an axial direction;

the outer ring of the spring gasket and the outer ring of the movable ring are both provided with limit grooves III that match with the limit protrusions III; and a limit protrusion IV is arranged inside the end cap II, and a limit groove IV matching with the limit protrusion IV is arranged on the static ring.

4. The inflation control apparatus for an IV-type hydrogen storage container according to claim 3, wherein an annular sealing ring groove is arranged on the annular end surface I of the movable ring, a movable ring sealing ring in contact with the spring gasket is installed in the annular sealing ring groove, and the inner ring of the movable ring sealing ring is provided with the limit groove I; and an end cap sealing ring is installed between the end cap II and the end cap I.

5. The inflation control apparatus for an IV-type hydrogen storage container according to claim 4, wherein a signal wire hole is arranged on the end cap II of the rotary inflation connector on one side, and a sensor installation rod with a hollow structure is installed on the inner side of the signal wire hole; and the temperature and pressure sensor is installed on the sensor installation rod, and the signal wire passes through the sensor installation rod and the signal wire hole to connect with the controller.

6. The inflation control apparatus for an IV-type hydrogen storage container according to claim 5, wherein the rack comprises a square frame, two horizontal installation rods and two vertical installation plates;

the two vertical installation plates are located in the square frame, and are parallel to two vertical beams of the square frame;

the horizontal installation rods pass through the vertical installation plates and the two vertical beams of the square frame;

the seal heads at both ends of the container liner are rotatably installed on the vertical installation plates through a bearing II;

an inner ring of the bearing II is provided with the limiting groove I, and an outer ring is provided with a limiting protrusion V; and a limiting groove V matching with the limiting protrusion V is arranged on the vertical installation plate.

7. The inflation control apparatus for an IV-type hydrogen storage container according to claim 1, further comprising a valve IV and a diverter valve block II;

wherein the diverter valve block I is further provided with an air outlet IV communicated with the air inlet; and the air outlet I, the air outlet II, the air outlet III and the air outlet IV are independent of each other;

the air outlet IV of the diverter valve block I is connected with an air inlet of the valve IV;

an air outlet of the air heater and an air outlet of the valve IV are respectively connected to an air inlet I and an air inlet II of the diverter valve block II, and an air outlet of the diverter valve block II is connected to the air inlet of the inflation core tube; and both the air inlet I and the air inlet II of the diverter valve block II are in communication with the air outlet; and the air inlet I and the air inlet II are independent of each other.

8. The inflation control apparatus for an IV-type hydrogen storage container according to claim 1, wherein the electrically controlled flow regulating valve is electromagnetically controlled, and comprises an electromagnet, a valve seat, a pressure regulating nut, a valve stem, a regulating spring, and a lock nut;

the valve seat is provided with an air inlet, an air outlet, and an air passage communicating the air inlet with the air outlet;

both ends of the air passage are provided with internal threads, the pressure regulating nut is installed at a first end, and the lock nut is installed at a second end;

the valve stem passes through the pressure regulating nut, the first end is connected with a push-pull rod of the electromagnet, and the second end is provided with a valve core which is in sealing contact with the inner wall of the air passage; and the adjusting spring is installed between the valve core and the lock nut, and the two ends are respectively pressed by the valve core and the lock nut.

\* \* \* \* \*